(12) United States Patent
Strong et al.

(10) Patent No.: US 12,099,591 B1
(45) Date of Patent: Sep. 24, 2024

(54) POLICY TROUBLESHOOTING FOR UNINTENTIONAL ALLOWANCES

(71) Applicant: Amazon Technologies, Inc., Seattle, WA (US)

(72) Inventors: Homer Strong, Seattle, WA (US); Lucie Klimosova, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 17/547,786

(22) Filed: Dec. 10, 2021

(51) Int. Cl.
*G06F 21/41* (2013.01)
*G06F 21/31* (2013.01)

(52) U.S. Cl.
CPC ............ *G06F 21/41* (2013.01); *G06F 21/316* (2013.01)

(58) Field of Classification Search
CPC ............................... G06F 21/41; G06F 21/316
See application file for complete search history.

(56) References Cited

U.S. PATENT DOCUMENTS

| | | | |
|---|---|---|---|
| 7,580,919 | B1 | 8/2009 | Hannel et al. |
| 9,877,227 | B2 | 1/2018 | Zhang et al. |
| 10,320,624 | B1 * | 6/2019 | Roth ..................... H04L 63/164 |
| 10,581,919 | B2 | 3/2020 | Kruse et al. |

OTHER PUBLICATIONS

Soatto, Stefano; "Graceful AI"; https://www.amazon.science/latest-news/graceful-ai; Amazon.com; May 13, 2021; accessed Feb. 14, 2023; 6 pages.
Shen et al.; "Towards Backward-Compatible Representation Learning"; IEEE/CVF Conf. on Computer Vision and Pattern Recognition; 2020; p. 6368-6377.
Katz et al.; "Reluplex: An Efficient SMT Solver for Verifying Deep Neural Networks"; Int'l Conf. on Computer Aided Verification; May 2017; 31 pages.
Huang et al.; "A survey of safety and trustworthiness of deep neural networks: Verification, testing, adversarial attack and defence, and interpretability"; Computer Science Review; vol. 37; May 2020; 95 pages.
Liu et al.; "Algorithms for Verifying Deep Neural Networks"; Foundations and Trends; vol. 4; Feb. 2021; 161 pages.
Yan et al.; "Positive-Congruent Training: Towards Regression-Free Model Updates"; IEEE/CVF Conf. on Computer Vision and Pattern Recognition; May 2021; p. 14299-14308.
Yan et al.; "Positive-Congruent Training: Towards Regression-Free Model Updates"; https://arxiv.org/pdf/2011.09161.pdf; May 2021; 12 pages.

* cited by examiner

*Primary Examiner* — El Hadji M Sall
(74) *Attorney, Agent, or Firm* — BakerHostetler

(57) ABSTRACT

One or more indications may be received of a decision to allow an access of a computing resource by an identity. A plurality of relevant policies may be determined whose permissions are evaluated as inputs to the decision to allow. One or more explicit allow policies of the plurality of relevant access permission policies may be determined that explicitly allow the access. At least one explicit allow indication may be provided of at least one of the one or more explicit allow policies. One or more acceptable properties of the plurality of relevant access permission policies may be determined that do not need to be modified to change the decision to allow the access. One or more acceptability indications may be provided of the one or more acceptable properties.

20 Claims, 11 Drawing Sheets

FIG. 2

Feedback 111A

Fixes needed to change deny

[{'arn': 'example-A-bucket',  
'msg': 'Remove explicit deny',  
'url': 'https://s3.console.aws.amazon.example/s3/buckets/example-A-bucket?tab=permissions'},    121A {'arn': ['arn:aws:iam::aws:policy/AmazonChimeReadOnly',  
    'arn:aws:iam::XYZ:policy/test-s3-policy',  
    'arn:aws:iam::XYZ:policy/test-s3-object',  
    'example-A-bucket'],  
'msg': 'Either resource or IAM policy must allow',  
'url': ['https://console.aws.amazon.example/iam/home#/policies/arn:aws:iam::aws:policy/AmazonChimeReadOnly',  
    'https://console.aws.amazon.example/iam/home#/policies/arn:aws:iam::XYZ:policy/test-s3-policy',  
    'https://console.aws.amazon.example/iam/home#/policies/arn:aws:iam::XYZ:policy/test-s3-object',  
    'https://s3.console.aws.amazon.example/s3/buckets/example-A-bucket?tab=permissions']}]    122A 'example_statement': {'Action': 's3:GetBucketAcl',  
    'Effect': 'Allow',  
    'Principal': {'AWS':'arn:aws:iam::XYZ:role/access-denied-test-case'},  
    'Resource': 'arn:aws:s3:::example-A-bucket',  
    'Sid': 'AllowGranularAccess'},    123A Things that are OK

[{'arn': 'arn:aws:iam::aws:policy/AmazonChimeReadOnly',  
'msg': 'No explicit denies',  
'url': 'https://console.aws.amazon.example/iam/home#/policies/arn:aws:iam::aws:policy/AmazonChimeReadOnly'},  
{'arn': 'arn:aws:iam::XYZ:policy/test-s3-policy',  
'msg': 'No explicit denies',  
'url': 'https://console.aws.amazon.example/iam/home#/policies/arn:aws:iam::XYZ:policy/test-s3-policy'},  
{'arn': 'arn:aws:iam::XYZ:policy/test-s3-object',  
'msg': 'No explicit denies',  
'url': 'https://console.aws.amazon.example/iam/home#/policies/arn:aws:iam::XYZ:policy/test-s3-object'}]    124A

POLICY TROUBLESHOOTING FOR UNINTENTIONAL ALLOWANCES

CROSS-REFERENCE TO RELATED APPLICATIONS

This application is related to U.S. patent application Ser. No. 17/547,659 filed Dec. 10, 2021, entitled "TROUBLESHOOTING POLICY-BASED PERMISSIONS".

BACKGROUND

Identity management services may allow customers to control and manage access to computing services and resources by creating identities (e.g., users, groups, roles, etc.) and defining permissions for the identities. In some examples, permissions for an identity may be defined by attaching a policy to the identity, and the policy may define permissions that are allocated to the identity. Similarly, policies may also be defined and attached to other entities, such as computing resources, sessions, accounts, and others. An unintended denial of access may occur when a customer intends for a given identity to be able to have a given access to a given resource, but the relevant policies are not configured to allow the given identity to have the given access to the given resource. Customers may often become frustrated when a request to access a computing resource is unintentionally denied, and customers may often be unsure of which changes are necessary in order to correct an unintended denial of access. For example, customers may often be unsure of which policies are causing the denial of access. As another example, customers may also be unsure of whether a given denial of access is due to explicit denials and/or implicit denials related to one or more policies. These and other problems may cause customers to use overly broad permissions, thereby resulting in security risks. Moreover, these and other problems may cause permissions configuration to consume valuable customer time and effort, thereby reducing efficiency and customer satisfaction. Additionally, customers may also have difficulty in attempting to debug an unintended allowance of access, which may occur when a customer intends for a given identity not to be able to have a given access to a given resource, but the relevant policies are configured to allow the given identity to have the given access to the given resource.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating example policy-based permissions troubleshooting feedback that may be used in accordance with the present disclosure.

DETAILED DESCRIPTION

Figure 1:
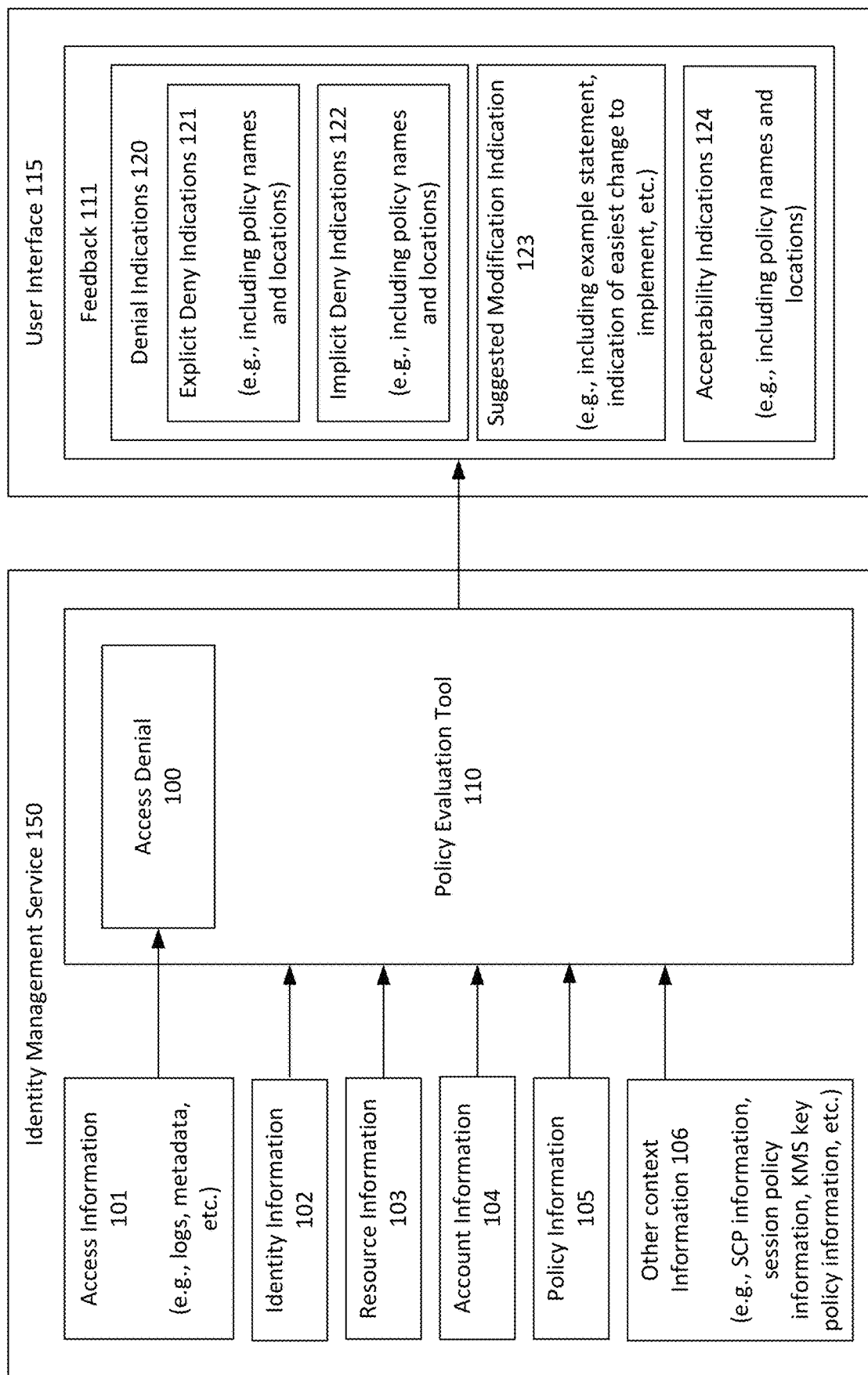
FIG. 1 is a diagram illustrating an example unintended access denial troubleshooting system that may be used in accordance with the present disclosure.

Techniques for troubleshooting policy-based permissions are described herein. An unintended denial of access may occur when a customer intends for a given identity to be able to have a given access to a given resource, but the relevant policies are not configured to allow the given identity to have the given access to the given resource. In some examples, an identity management service may provide a policy evaluation tool that may evaluate a given denial of access and provide a customer with feedback regarding policies that may be modified in order to correct an unintended denial of access. Additionally, in some examples, the policy evaluation tool may also provide feedback regarding policy properties that are acceptable, meaning that they don't need to be changed in order to correct an unintended denial of access.

The policy evaluation tool may provide indications of each policy (if any) that explicitly denies an attempted access and each policy (if any) that implicitly denies an attempted access. In some examples, access to resources may be denied by default, meaning that an attempted resource access will be denied unless one or more policies cause the attempted resource access to be allowed. Thus, an explicit denial of access may occur when a policy explicitly forbids an attempted access from occurring. By contrast, an implicit denial of access may occur when no policy explicitly forbids an attempted access from occurring, but the access is nevertheless denied, for example because no policy explicitly allows an attempted access to occur. Additionally, in some examples, an explicit denial my trump any explicit allowances. Thus, as long as any applicable policy explicitly denies an attempted access from occurring, the access may be denied even if one or more other applicable policies would otherwise allow the attempted access.

In some examples, the indications of explicit denials may include a name of each policy that explicitly denies access and an identification (e.g., a uniform resource locator (URL), etc.) of a location (e.g., console page, infrastructure as code template interface, etc.) of each such policy. The explicit denial indications may also have an associated description, which may indicate that the corresponding policies (or policy) explicitly deny access and/or that explicit denials must be removed in order to correct an unintended denial of access. Additionally, in some examples, the indications of implicit denials may include a name of each policy that implicitly denies access, an identification (e.g., URL, etc.) of a location (e.g., console page, infrastructure as code template interface, etc.) of each such policy, and a corresponding description. The implicit denial indications may also have an associated description, which may indicate that the corresponding policies (or policy) implicitly deny access and/or that at least one relevant policy (e.g., either an identity policy and/or a resource policy) must allow access in order to correct an unintended denial of access.

A user may navigate to an identified policy location (console page, infrastructure as code template interface, etc.) in order to modify a policy, such as to remove a policy feature that explicitly denied the access and/or to add a policy feature that explicitly allows the access. In some examples, the policy evaluation tool may generate and provide a suggested modification indication, such as an example statement that may be added to a policy in order to allow the attempted access to be performed. In some other examples, the suggested modification indication may include an indication of a modification (e.g., by indicating the policy, statement, etc.) that would be easiest for a user to implement, such as a modification that requires adding or modifying a fewest amount of characters.

The policy evaluation tool may also provide indications of policy properties that are acceptable. In the context of an unintended denial of access, the acceptable properties may include properties that don't need to be changed in order to correct the unintended denial of access. These may include, for example, indications of policies that explicitly allow access and/or policies that do not explicitly deny access. In one specific example, the policy evaluation tool may identify each such policy (e.g., via policy name, URL, etc.) along with an indication that the policy explicitly allowed access and/or did not explicitly deny access. The indications of acceptable policy properties may help the customer to rule-out features that do not need to be changed in order to correct an unintended denial of access. This may be particularly advantageous in scenarios in which a policy that explicitly causes a denial of access may not be accessible to a given user, such as scenarios in which the policy is managed by an account that a user cannot access. In these scenarios, the policy evaluation tool may help a given user to partially debug an unintended denial of access, such as by allowing a user to confirm that he or she has made any necessary changes in the accounts that he or she is permitted to access.

Thus, the troubleshooting feedback described herein may provide a number of advantages to customers. For example, the feedback may inform the customer of which policies are causing the denial of access, and whether each policy is explicitly and/or implicitly causing the denial of access. In some examples, a user may be unaware of certain applicable policies that may affect the outcome of a permissions decision. Additionally, the troubleshooting feedback described may inform the user of acceptable policy properties, such as to assist the user in partial debugging or to otherwise confirm that a user has made necessary changes to accessible policies. As a specific example, for cross-account access, such as scenarios in which an identity in one account is attempting to access a resource in another account, it may be difficult to know whether the causes of a denial access are in policies attached to identity, policies attached to the resource, or both. This is because, for cross account access, both at least one identity policy and at least one resource policy may be required to both grant access in order for an attempted access to be allowed. For at least the reasons described above, the troubleshooting feedback described herein may assist in full and/or partial debugging in these and other scenarios.

Additionally, in some examples, the troubleshooting feedback described herein may assist users by identifying relevant, and potentially problematic, policies of which a user may be unaware, such as a service control policy (SCP), a session policy, a key management service (KMS) key policy, and others. As a specific example, in some cases, an identity may issue a request to obtain an object from a given bucket, and the identity may have access to the bucket. For example, a policy attached to the identity may explicitly grant the identity access to the bucket. Nevertheless, in some cases, if the bucket is encrypted with a KMS key, a KMS key policy may also influence the identity's ability to access the bucket. In some examples, if the KMS key policy doesn't grant access to the identity, then the identity's request to access the bucket may be denied. In some cases, a user may be unaware of the KMS key policy and its applicability to the bucket, and the user may become frustrated when the user attempts to debug the unintended denial of access to the bucket. However, the troubleshooting feedback described herein may inform the user of the KMS key policy and its impact on the denial of access, thereby assisting the user to perform efficient debugging.

Moreover, for scenarios in which multiple different changes to multiple different accounts may be performed in order to correct an unintended denial of access, the troubleshooting feedback described herein may provide indications of these multiple options to the user, thereby providing the user with flexibility to choose to perform the modifications that are preferred by the user. For example, some customers may focus their permissions management on identity policies (and may therefore prefer to make modification to identity policies as opposed to resource policies). By contrast, some other customers may focus their permissions management on resource policies (and may therefore prefer to make modification to resource policies as opposed to identity policies).

In some examples, in order to provide the feedback described above, the policy evaluation tool may determine each policy that is relevant to a decision to deny access to a resource. In the context of an unintended denial of access, the relevant policies are each policy whose permissions are evaluated as inputs to the decision to deny access to the resource. In many examples, the relevant policies may often include at least one or more identity policies, which are policies that are attached to the identity on whose behalf the access is attempted, and one or more resource policies, which are policies that are attached to the resource upon which the access is attempted. It is noted, however, that the relevant policies may sometimes include additional policies (if applicable), such as an SCP, a session policy, a KMS key policy, and others. In some examples, the policy evaluation tool may determine only those policies that are both relevant and accessible to the tool's operator. For example, accessible policies may include policies that are modifiable by (e.g., within the same account as) a current operator of the policy evaluation tool. The policy evaluation tool may then evaluate the attempted access on each of the relevant and accessible policies separately, such as to determine whether each of the policies explicitly and/or implicitly denies the attempted access.

In some examples, a troubleshooting evaluation of an access denied error, such as described above, may be triggered based at least in part on an analysis of a customer's actions over time. In some cases, customer actions, such as application programming interface (API) calls, may be recorded in logs, and these logs may be analyzed, such as by a monitoring service. In one specific example, these logs may be analyzed, such as to determine increases (e.g., a spikes) in access denied events, such as when more than a threshold quantity of access denied events occur within a given timeframe. A troubleshooting evaluation of an access denied error may then be automatically launched or otherwise triggered based on this increase in access denied events and/or other factors. In addition or as an alternative to logs, other sources of access information may also be analyzed, such as metadata from a command line interface (CLI) or other interface and/or metadata from an identity, account, organization, resource, service, action or any other source.

FIG. 1 is a diagram illustrating an example unintended access denial troubleshooting system that may be used in accordance with the present disclosure. As shown in FIG. 1, a policy evaluation tool 110, such as may be provided by identity management service 150, may be employed to provide feedback 111 regarding an access denial 100, which may be an unintended denial of access. An identity management service 150 is a service that allows customers to control and manage access to computing services and resources by creating identities (e.g., users, groups, roles, etc.) and defining permissions for the identities. The access denial 100 may, for example, be a denial of an attempt by an identity (e.g., a role, group, user, etc.) to access a computing resource. Specifically, the policy evaluation tool 110 may receive access information 101, which includes information pertaining to access denial 100, such as information indicating the identity attempting the access, the resource for which the access was attempted, the type of access (e.g., type of API call) that was requested, session information for the access, and other relevant information. Some example categories of access may include read, write, permissions management, list, tagging, and others. An access type may include any types of access within these or other access categories. In some examples, access information 101 may be received from logs, such as logs that record customer activity (e.g., API calls). Also, in some examples, access information 101 may be received from metadata, such as such as metadata from a CLI or other interface and/or metadata from an identity, account, organization, resource, service, action or any other source.

Policy evaluation tool 110 may also access identity information 102, which includes information pertaining to the identity that attempted the access, such as an indication of each policy that is attached to the identity. Policy evaluation tool 110 may also access resource information 103, which includes information pertaining to the resource upon which the access was attempted, such as an indication of each policy that is attached to the resource. Policy evaluation tool 110 may also access account information 104, which includes information pertaining to the accounts associated with the identity management service 150, such as may be used to determine an account in which the identity is included, an account in which the resource is included, and an account of a user/operator of the policy evaluation tool 110. Policy evaluation tool 110 may also access policy information 105, which includes information pertaining to policies that are created and managed via the identity management service 150, for example including service-generated policies and customer-generated policies. For example, the policy information 105 may include indications of the permissions provided by policies that are created and managed via the identity management service 150.

Additionally, policy evaluation tool 110 may also access other context information 106, which includes additional context information, such as information indicating whether one or more additional policies (e.g., other than identity policies and resource policies) are relevant to access denial 100. For example, these additional policies may include a service control policy (SCP), a session policy, a key management service (KMS) key policy, and other additional policies. Specifically, an SCP is a policy that may be employed at an organization-wide level to assign permissions. In some examples, if an SCP is applicable to an identity requesting an access, then the access may be implicitly denied unless allowed by the SCP. A session policy is an inline permissions policy that users pass in a session when they assume a role. A KMS key policy is a policy that may be attached to a KMS key, such as to define permissions for using the KMS key. Thus, a KMS key policy may be relevant when a resource to which access is requested is encrypted using a KMS key.

In some examples, based at least in part on access information 101, identity information 102, resource information 103, account information 104, policy information 105 and/or other context information 106, policy evaluation tool 110 may provide feedback 111 related to access denial 100, such as to allow full or partial debugging of the access denial 100. The feedback may be displayed in user interface 115. In the example of FIG. 1, feedback 111 includes denial indications 120, which are indications of policies that explicitly and/or implicitly deny the access that results in access denial 100. In this example, denial indications 120 include explicit deny indications 121 and implicit deny indications 122. In some examples, explicit deny indications 121 may include a name of each policy that explicitly denies access and an identification (e.g., a URL, etc.) of a location (e.g., console page, infrastructure as code template interface, etc.) of each such policy. The explicit deny indications 121 may also have an associated description, which may indicate that the corresponding policies (or policy) explicitly deny access and/or that explicit denials must be removed in order to correct an unintended denial of access. In some examples, the explicit deny indications 121 may explicitly state that a corresponding policy (or policies) explicitly denies access. However, it is not required that the explicit deny indications 121 must explicitly state that a corresponding policy (or policies) explicitly denies access. For example, in some cases, the explicit deny indications 121 may merely provide a description that indicates and/or allows a user to infer that a corresponding policy (or policies) explicitly denies access, such as a description that states that all explicit denies must be removed.

Additionally, in some examples, implicit deny indications 122 may include a name of each policy that implicitly denies access, an identification (e.g., URL, etc.) of a location (e.g., console page, infrastructure as code template interface, etc.) of each such policy, and a corresponding description. The implicit deny indications 122 may also have an associated description, which may indicate that the corresponding policies (or policy) implicitly deny access and/or that at least one relevant policy (e.g., either an identity policy and/or a resource policy) must allow access in order to correct an unintended denial of access. In some examples, the implicit deny indications 122 may explicitly state that a corresponding policy (or policies) implicitly denies access. However, it is not required that the implicit deny indications 122 must explicitly state that a corresponding policy (or policies) implicitly denies access. For example, in some cases, the implicit deny indications 122 may merely provide a description that indicates and/or allows a user to infer that a corresponding policy (or policies) implicitly denies access, such as a description that either a resource policy or an identity policy must allow access.

In this example, feedback 111 also includes suggested modification indication 123, which is an indication of a modification that may be made to a policy in order to allow the attempted access to be performed. In some examples, suggested modification indication 123 may include an example statement that may be added to a policy in order to allow the attempted access to be performed. Also, in some examples, in addition or as an alternative to an example statement, the suggested modification indication 123 may include an indication of a suggested policy that the user may edit in order to correct the denial of access. In one specific example, the policy evaluation tool 110 may evaluate all potential changes that may be made to different policies and may determine a change that would be easiest for the user to implement, such as a change that requires adding or modifying a fewest amount of characters in the contents of a policy. The policy evaluation tool may then suggest that the user modify the policy that is determined to be easiest to change, thereby reducing the amount of work required by the user to correct the access denial 100.

In this example, feedback 111 also includes acceptability indications 124, which are indications of policy properties that don't need to be changed in order to correct an unintended denial of access. The acceptability indications 124 may include, for example, indications of policies that explicitly allow access and/or policies that do not explicitly deny access. In one specific example, the acceptability indications 124 may include indications of each such policy (e.g., via policy name, URL, etc.) along with an indication that the policy explicitly allowed access and/or did not explicitly deny access. The acceptability indications 124 may help the customer to rule-out features that do not need to be changed in order to correct an unintended denial of access. This may be particularly advantageous in scenarios in which a policy that explicitly causes a denial of access may not be accessible to a given user, such as scenarios in which the policy is managed by an account that a user cannot access. In these scenarios, the policy evaluation tool 110 may help a given user to partially debug an unintended denial of access, such as by allowing a user to confirm that he or she has made any necessary changes in the accounts that he or she is permitted to access.

Referring now to FIG. 2, a specific example of feedback 111 will now be described in detail. Specifically, as shown in FIG. 2, feedback 111A is a specific example of feedback 111 of FIG. 1. In this example, feedback 111A corresponds to an example in which an example identity (XYZ:role/access-denied-test-case) has attempted to access an example resource (example-A-bucket) by requesting an example action (GetBucketAcl) to get an access control list. In this example, the requested action is unintentionally denied, and a user is attempting to debug the unintended denial of access. As shown in FIG. 2, feedback 111A includes explicit deny indication 121A, which is a specific example of explicit deny indications 121 of FIG. 1. In this example, explicit deny indication 121A identifies (via the 'am' line of explicit deny indication 121A) a name (example-A-bucket) of a policy that explicitly denies the requested access, which in this example is the resource policy for the requested resource. Additionally, explicit deny indication 121A identifies (via the 'url' line of explicit deny indication 121A), a URL for this policy. Furthermore, explicit deny indication 121A indicates (via the 'msg' line of explicit deny indication 121A) that the explicit denial must be removed in order to correct the unintended denial of access.

As also shown in FIG. 2, feedback 111A includes implicit deny indications 122A, which are specific examples of implicit deny indications 122 of FIG. 1. In this example, there are four policies that implicitly deny the requested access, including the resource policy (example-A-bucket) and three policies that are attached to the identity that requested the access (AmazonChimeReadOnly, test-s3-policy and test-s3-object). The implicit deny indications 122A identify (via the 'am' lines of implicit deny indications 122A) the names of the four policies that implicitly deny the requested access. Additionally, implicit deny indications 122A identify (via the 'url' lines of implicit deny indications 122A), URL's for these four policies. Furthermore, implicit deny indications 122A indicate (via the 'msg' line of implicit deny indications 122A) that either the resource policy or an identity and access management (IAM) policy (e.g., an identity policy) must allow access in order to correct the unintended denial of access.

As also shown in FIG. 2, feedback 111A includes suggested modification indication 123A, which is a specific example of suggested modification indication 123 of FIG. 1. In this example, suggested modification indication 123A includes an example statement that may be added into a policy to cause the requested action (GetBucketAcl) to be allowed for the requesting identity (XYZ:role/access-denied-test-case) on the requested resource (example-A-bucket).

As also shown in FIG. 2, feedback 111A includes acceptability indications 124A, which are specific examples of acceptability indications 124 of FIG. 1. In this example, the acceptability indications 124A identify (e.g., via the 'am' lines of acceptability indications 124A) the name of each of the three relevant policies that did not explicitly deny the attempted access. Additionally, the acceptability indications 124A identify (e.g., via the 'url' lines of acceptability indications 124A) a URL of each of the three relevant policies that did not explicitly deny the attempted access. Furthermore, acceptability indications 124A indicate (via the 'msg' line of acceptability indications 124A) that each of the three listed policies did not explicitly deny the requested access.

Figure 3:
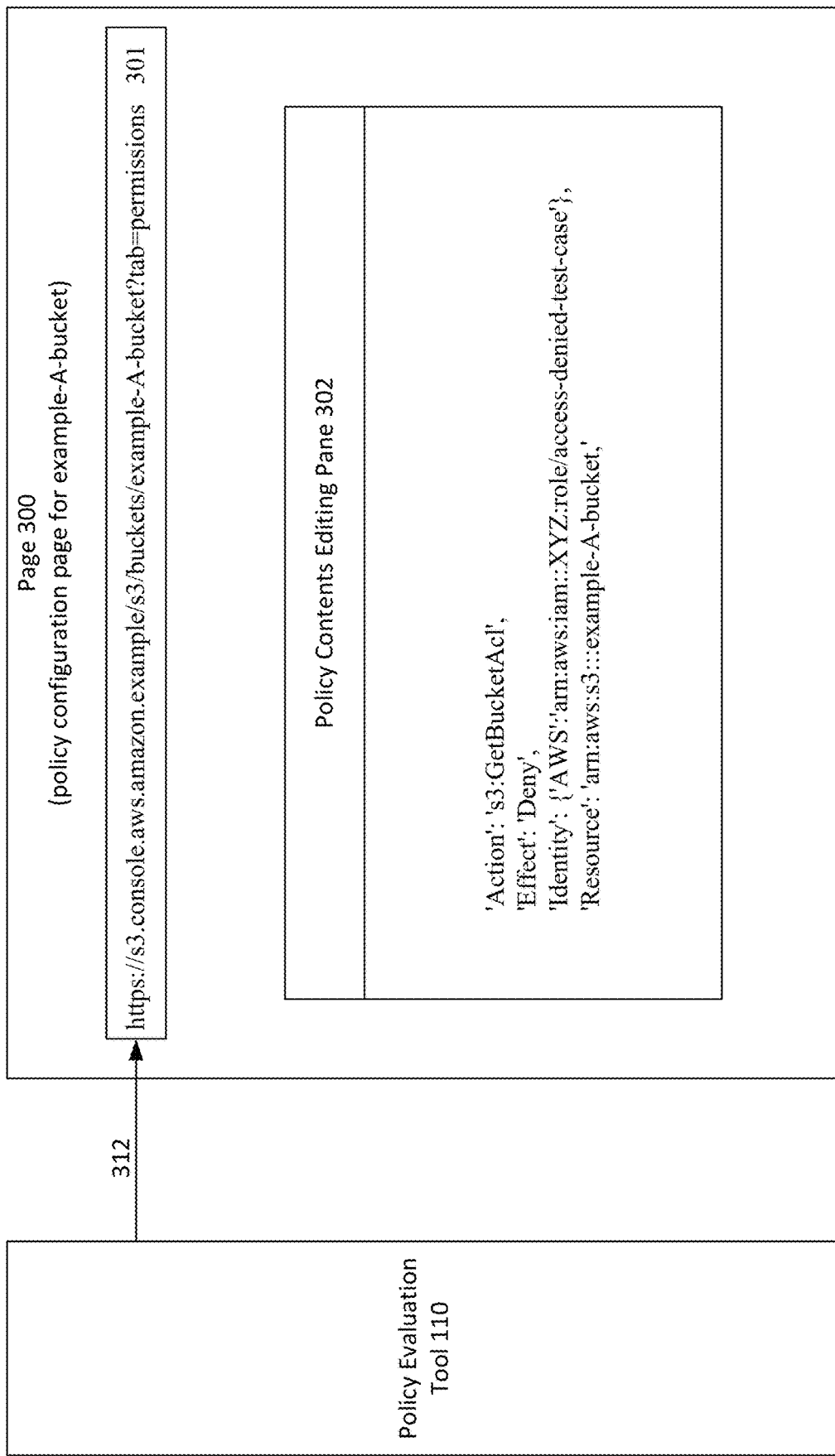
FIG. 3 is a diagram illustrating an example troubleshooting feedback-based navigation to a policy page that may be used in accordance with the present disclosure.

In some examples, a user may navigate to an identified policy location (console page, infrastructure as code template interface, etc.) in order to modify a policy, such as to remove a policy feature that explicitly denied the access and/or to add a policy feature that explicitly allows the access. Referring now to FIG. 3, a specific example is shown, in which a user navigates to page 300, which is a policy configuration page for the resource policy for the resource (example-A-bucket) to which access was requested in the example of FIG. 2. As shown in FIG. 3, page 300 includes policy contents editing pane 302, which shows the current contents of the resource policy and allows editing of those contents.

In some examples, the contents of the resource policy may be defined using a human-readable data format, such as JavaScript Object Notation (JSON).

The user may navigate to page 300 by employing the URL for the example-A-bucket resource policy (https://s3.console.aws.amazon.example/s3/buckets/example-A-bucket?tab=permissions) that is provided in the 'url' line of explicit deny indication 121A, such as by copying the URL from explicit deny indication 121A and pasting the URL into an address bar 301 of a browser or other program via which page 300 is accessed. In FIG. 3, arrow 312 indicates that the user may navigate to page 300 based at least in part on information in the explicit deny indication 121A provided by policy evaluation tool 110. In this example, page 300 may be, for example, a page of a web console interface provided by identity management service 150. It is noted, however, that policies may be configured and edited via a variety of other interfaces, such as a console page, an infrastructure as code template interface, and others, and the policy evaluation tool 100 may identify locations of any, or all, of these types of interfaces to users.

Figure 4:
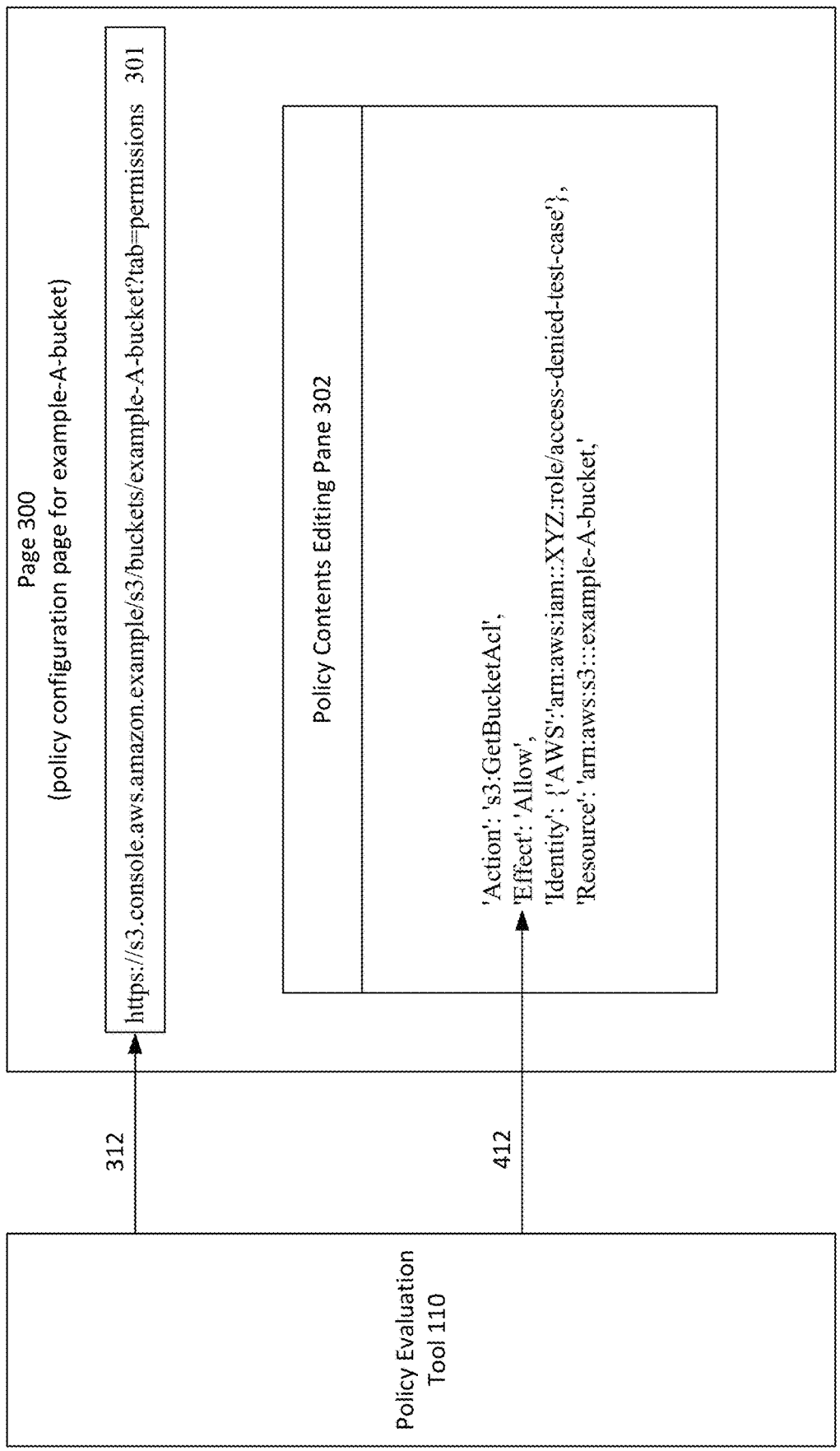
FIG. 4 is a diagram illustrating an example troubleshooting feedback-based policy modification that may be used in accordance with the present disclosure.

As shown in policy contents editing pane 302 of FIG. 3, the example-A-bucket resource policy includes a specific denial, as indicated by the second line of text in policy contents editing pane 302 (including the text 'Effect': 'Deny'). As indicated by the example statement shown in suggested modification indication 123A of FIG. 2, this explicit deny may be changed to an explicit allow by changing this line of text from 'Effect': 'Deny' to 'Effect': 'Allow'. Referring now to FIG. 4, it is shown that the user has modified this line of text to change the text from 'Effect': 'Deny' to 'Effect':'Allow'. In FIG. 4, arrow 412 indicates that the user may modify the policy contents editing pane 302 based at least in part on information in the suggested modification indication 123A provided by policy evaluation tool 110. As should be appreciated, by making this change to the example-A-bucket resource policy, the user removed the explicit denial that was formerly caused by this policy. Moreover, by making this change to the example-A-bucket resource policy, the user has also removed the implicit denials because a relevant resource policy now allows the access. Thus, the unintentionally denied access will now be allowed when re-attempted.

Figure 5A:
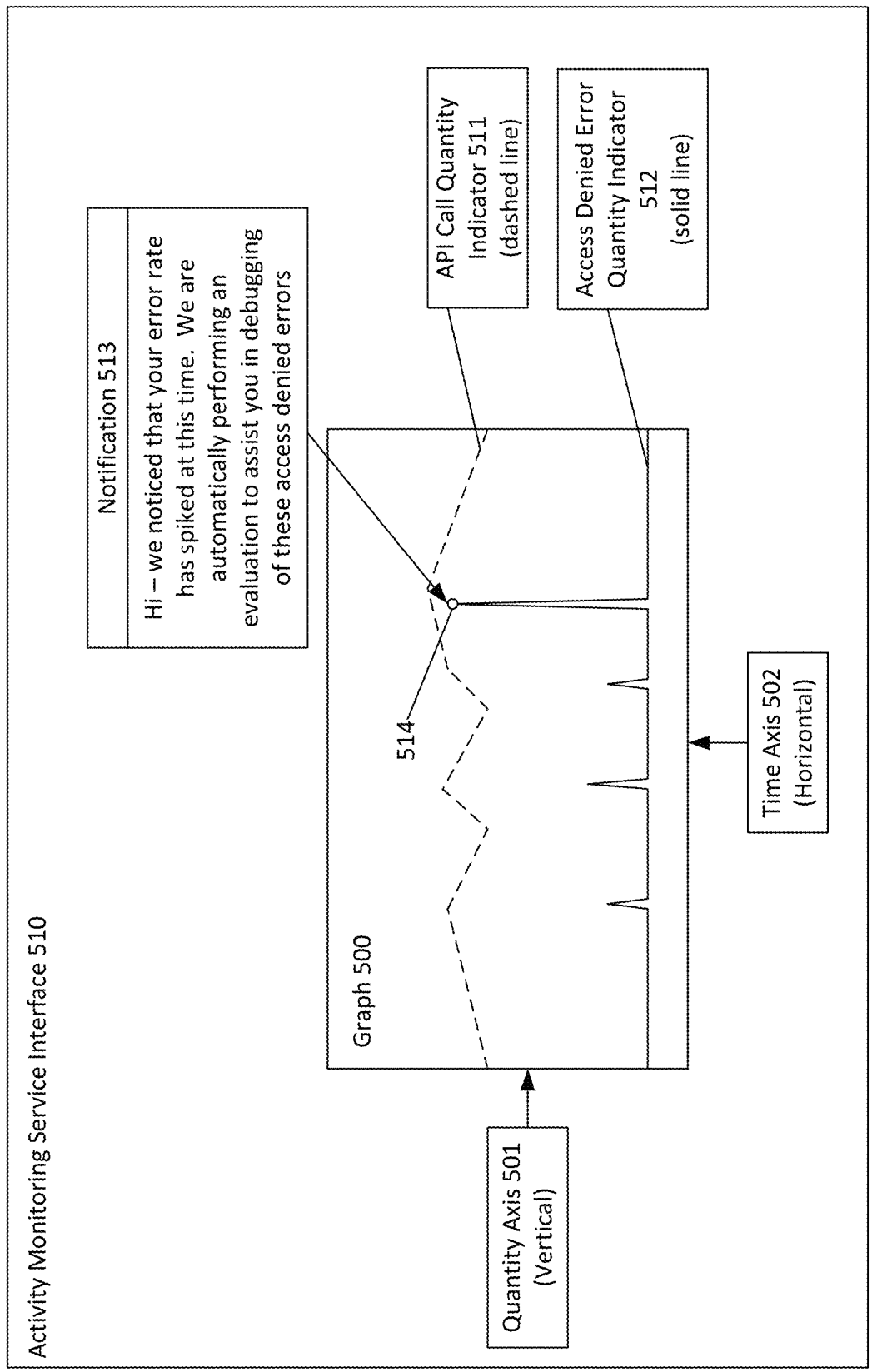
FIG. 5A is a diagram illustrating an example activity-based triggering of a troubleshooting evaluation that may be used in accordance with the present disclosure.

In some examples, a troubleshooting evaluation of access denied errors, such as described above with reference to FIGS. 1-4, may be triggered based at least in part on an analysis of a customer's actions over time. In some cases, customer actions, such as API calls, may be tracked and recorded in logs, and these logs may be analyzed, such as by a monitoring service. In one specific example, these logs may be analyzed, such as to determine increases (e.g., a spikes) in access denied events, such as when more than a threshold quantity of access denied events occur within a given timeframe. Referring now to FIG. 5A, an example is shown in which the policy evaluation tool 110 of FIG. 1 may be integrated with an activity monitoring service, such as to perform a troubleshooting evaluation based on customer activity that may be tracked by the activity monitoring service. Specifically, as shown in FIG. 5A, a user may view information about customer activity via an activity monitoring service interface 510, such as may be provided by an activity monitoring service. In this example, activity monitoring service interface 510 displays a graph 500, which shows amounts of customer API calls and corresponding access denied errors over time. As shown, graph 500 includes a quantity axis 501, which is a vertical axis of graph 500, and a time axis 502, which is a horizontal axis of graph 500. Graph 500 also includes API call quantity indicator 511, which is a dashed line that indicates an amount of API calls made by the customer over time. Additionally, graph 500 includes access denied error quantity indicator 512, which is a solid line that indicates an amount of corresponding access denied errors for the customer's API calls over time.

As shown in FIG. 5A, spike 514 indicates a point in time at which the rate of access denied errors increases dramatically as compared to other times captured by graph 500. In this example, activity monitoring service interface 510 provides a notification 513, which indicates to the user that a troubleshooting evaluation is automatically being performed, such as by policy evaluation tool 110 of FIG. 1, to assist the user in debugging the access denied errors occurring at the time of spike 514. It is noted that notification 513 merely provides one example of how a troubleshooting evaluation may be triggered and many other alternative techniques may be performed. For example, in some cases, as opposed to automatically launching an evaluation, a notification may be provided that asks the user to click (or otherwise request) the evaluation. In some examples, a troubleshooting evaluation may be triggered (either automatically or with user input) based at least in part on various factors, such as a detected increase in access denial errors, when error rate exceeds threshold rate, when an error quantity exceeds a threshold quantity, when an increase in the rate and/or quantity exceeds a given amount within a given time period, and other factors.

Figure 5B:
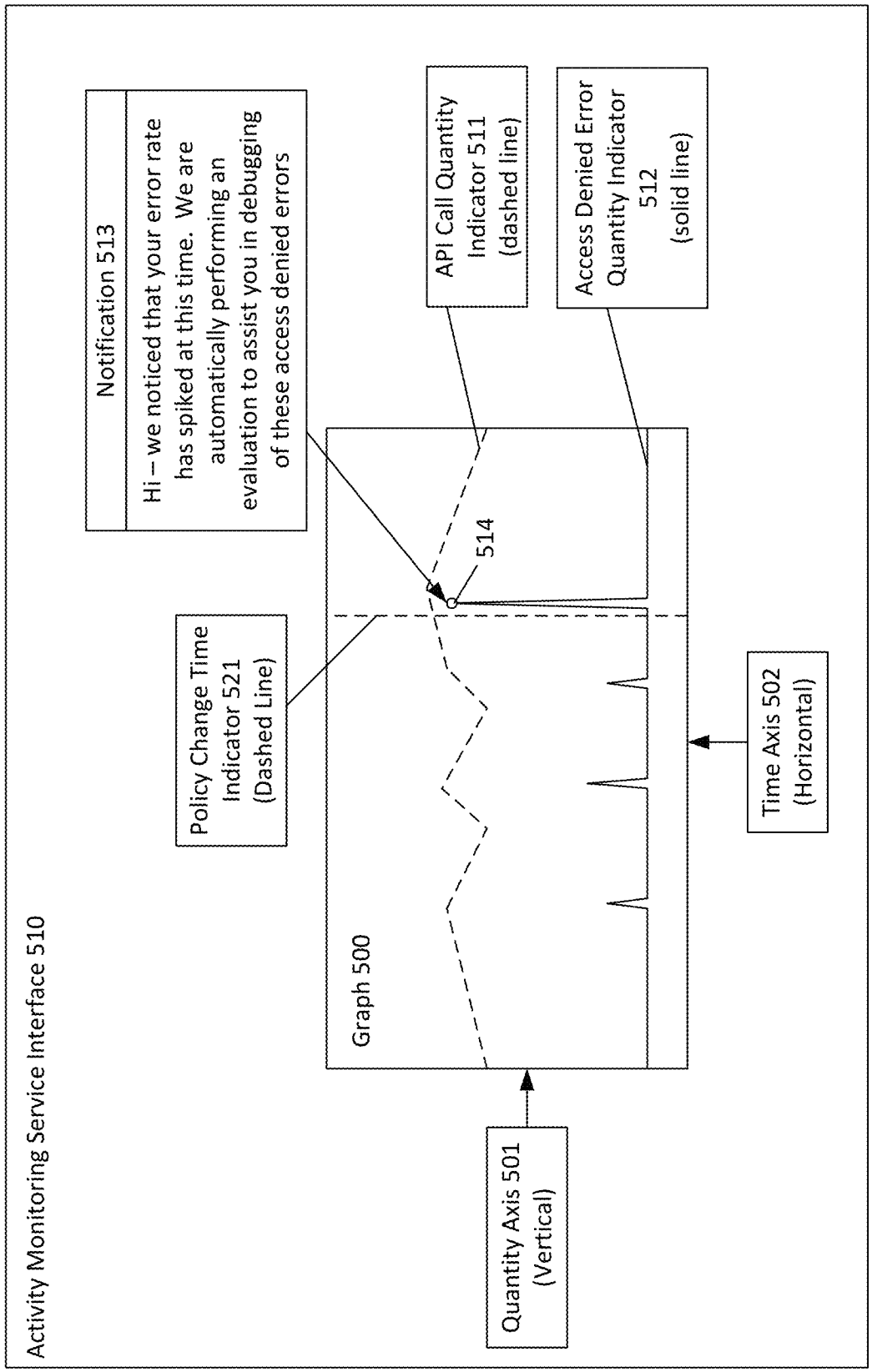
FIG. 5B is a diagram illustrating example policy timing change relationships that may be used in accordance with the present disclosure.

In some examples, it may also be useful to provide feedback to users regarding times at which permissions changes were made to one or more policies. This may assist the user in determining that one or more specific policy changes are related to a particular increase (e.g., spike 514) in errors. Referring now to FIG. 5B, an example is shown in which the activity monitoring service interface provides information regarding the relationship between policy changes and errors. Specifically, in FIG. 5B, graph 500 includes policy change time indicator 521, which is a dashed vertical line indicating a time at which one or more policies are changed by a user. As shown, the spike 514 occurs just after the policy change time indicator 521, thereby showing that the change in policies may be a likely cause of the increase in errors corresponding to spike 514.

Figure 6:
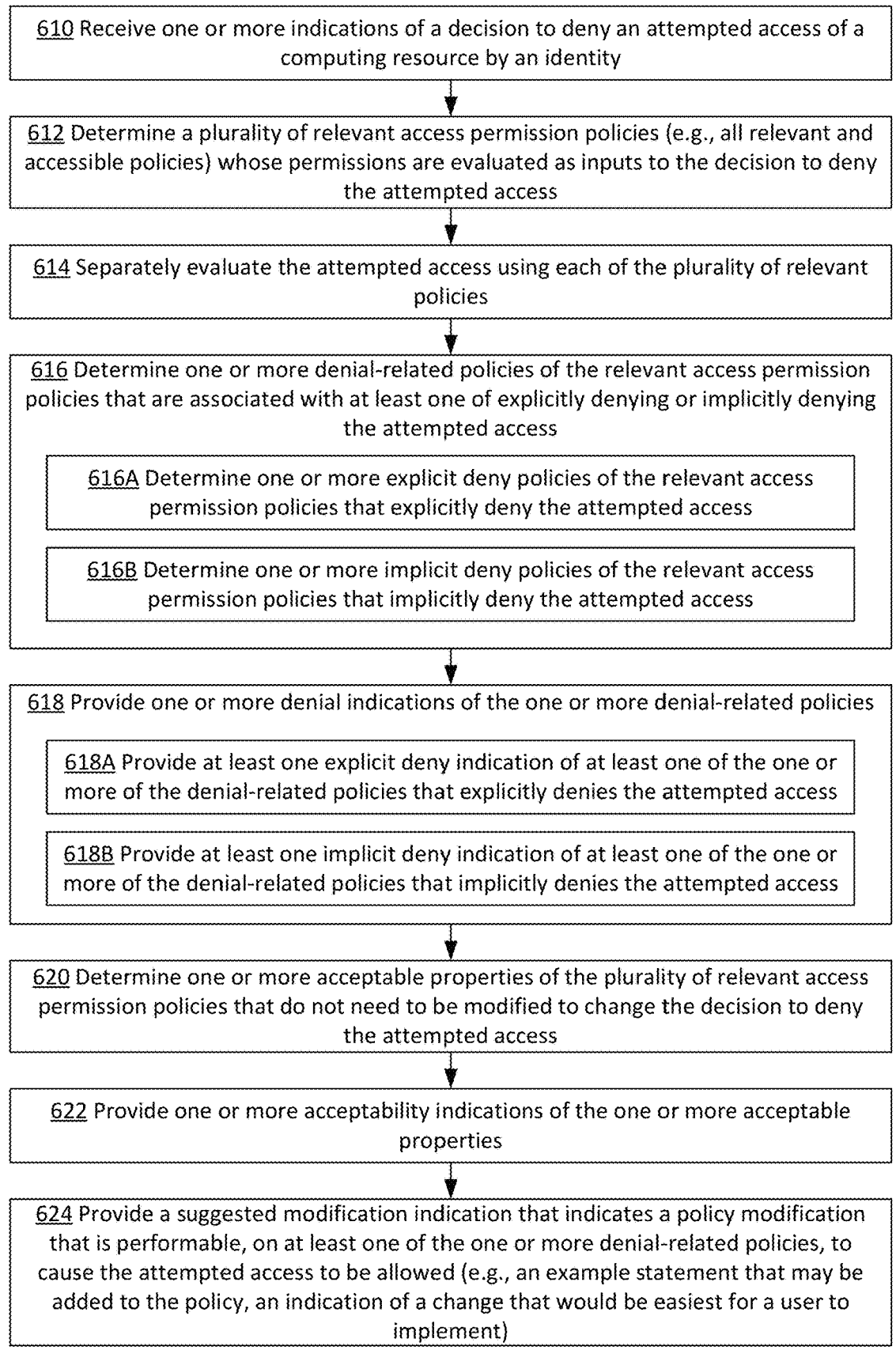
FIG. 6 is a flowchart illustrating an example unintended access denial troubleshooting process that may be used in accordance with the present disclosure.

FIG. 6 is a flowchart illustrating an example unintended access denial troubleshooting process that may be used in accordance with the present disclosure. In some examples, any, or all, of operations 610-624 of FIG. 6 may be performed by an identity management service 150, such as by policy evaluation tool 110 of identity management service 150. As described above with reference to FIG. 5A, an evaluation of a decision to deny an attempted access (e.g., including performing any, or all, of operations 610-624 of FIG. 6) may be performed based at least in part on a detected increase in access denial errors and/or other factors. The process of FIG. 6 is initiated at operation 610, at which one or more indications are received of a decision to deny an attempted access of a computing resource by an identity. The denial of the attempted access may be unintended, meaning that a customer intends for the identity to be able to have the attempted access to the resource, but the relevant policies are not configured to allow the identity to have the attempted access to the resource. As described above with reference to FIG. 1, policy evaluation tool 110 may receive access information 101, which includes information pertaining to access denial 100, such as information indicating the identity attempting the access, the resource for which the access was attempted, the type of access (e.g., type of API call) that was requested, session information for the access, and other relevant information. Some example categories of access may include read, write, permissions management, list, tagging, and others. An access type may include any types of access within these or other access categories. In some examples, access information 101 may be received from logs, such as logs that record customer activity (e.g., API calls). Also, in some examples, access information 101 may be received from metadata, such as such as metadata from a CLI or other interface and/or metadata from an identity, account, organization, resource, service, action or any other source.

At operation 612, a plurality of relevant access permission policies is determined whose permissions are evaluated as inputs to the decision to deny the attempted access. In the context of a decision to deny access, the relevant policies are each policy whose permissions are evaluated as inputs to the decision to deny access to the resource. In some examples, the relevant policies may include all policies that are attached to the identity that attempts the access and all policies that are attached to the resource upon which the access is attempted. It is noted, however, that the relevant policies may sometimes include additional policies (if applicable), such as an SCP, a session policy, a KMS key policy, and others. In some examples, the policy evaluation tool 110 may determine only those policies that are both relevant and accessible to the tool's operator. For example, accessible policies may include policies that are modifiable by (e.g., within the same account as) a current operator of the policy evaluation tool 110.

As described above, in some examples, in order to determine the relevant policies, the policy evaluation tool 110 may access identity information 102, resource information 103, account information 104, and other context information 106. Identity information 102 includes information pertaining to the identity that attempted the access, such as an indication of each policy that is attached to the identity. Resource information 103 includes information pertaining to the resource upon which the access was attempted, such as an indication of each policy that is attached to the resource. Account information 104 includes information pertaining to the accounts associated with the identity management service 150, such as may be used to determine an account in which the identity is included, an account in which the resource is included, and an account of a user/operator of the policy evaluation tool 110. Other context information 106 includes additional context information, such as information indicating whether one or more additional policies (e.g., other than identity policies and resource policies) are relevant to access denial 100. For example, these additional policies may include a service control policy (SCP), a session policy, a key management service (KMS) key policy, and other additional policies.

At operation 614, the attempted access is separately evaluated using each of the plurality of relevant policies. For example, the attempted access may be separately evaluated using each of the plurality of relevant policies to determine whether each of the plurality of relevant policies individually explicitly allows, explicitly denies and/or implicitly denies the attempted access. A policy may explicitly allow the attempted access if its permissions explicitly allow the attempted access. A policy may explicitly deny the attempted access if its permissions explicitly deny the attempted access. In this example, because the access is denied, a policy may be considered to implicitly deny the attempted access if its permissions do not explicitly allow the access. In some examples, a policy that explicitly denies the attempted access may also be considered to implicitly deny the attempted access. In other examples, a policy that explicitly denies the attempted access may not be considered to implicitly deny the attempted access. Each policy may be evaluated at operation 614 by obtaining and evaluating the permissions included within the policy, such as by accessing policy information 105. As described above, policy information 105 includes information pertaining to policies that are created and managed via the identity management service 150, for example including service-generated policies and customer-generated policies. For example, the policy information 105 may include indications of the permissions provided by policies that are created and managed via the identity management service 150.

At operation 616, one or more denial-related policies of the relevant access permission policies are determined that are associated with at least one of explicitly denying or implicitly denying the attempted access. In some examples, operation 616 may include sub-operations 616A and/or 616B. At sub-operation 616A, one or more explicit deny policies of the relevant access permission policies are determined that explicitly deny the attempted access. At sub-operation 616B, one or more implicit deny policies of the relevant access permission policies are determined that implicitly deny the attempted access. Operation 616 (including sub-operations 616A and/or 616B) may be performed based on the results of operation 614 described above. Specifically, as described above, the attempted access may be separately evaluated using each of the plurality of relevant policies to determine whether each of the plurality of relevant policies individually explicitly allows, explicitly denies and/or implicitly denies the attempted access. A policy may explicitly allow the attempted access if its permissions explicitly allow the attempted access. A policy may explicitly deny the attempted access if its permissions explicitly deny the attempted access. In this example, because the access is denied, a policy may be considered to implicitly deny the attempted access if its permissions do not explicitly allow the access. In some examples, a policy that explicitly denies the attempted access may also be considered to implicitly deny the attempted access. In other examples, a policy that explicitly denies the attempted access may not be considered to implicitly deny the attempted access. Thus, a denial related policy may include each policy that, when separately evaluated for the attempted access, explicitly and/or implicitly denies the access. Additionally, an explicit deny policy may include each policy that, when separately evaluated for the attempted access, explicitly denies the access. Furthermore, an implicit deny policy may include each policy that, when separately evaluated for the attempted access, implicitly denies the access.

At operation 618, one or more denial indications of the one or more denial-related policies are provided. Operation 618 may include displaying, in a user interface, indications of the one or more denial-related policies, such as a name of each of the one or more denial-related policies. Additionally, the one or more denial indications may include identifications (e.g., URL's, etc.) of locations (e.g., console page, infrastructure as code template interface, etc.) that allow modification of the one or more denial-related policies. In some examples, operation 618 may include sub-operations 618A and/or 618B. At sub-operation 618A, at least one explicit deny indication is provided of at least one (and, in some cases, all) of the one or more denial-related policies that explicitly denies the attempted access. For example, sub-operation 618A may include providing at least one explicit deny indication of at least one (and, in some cases, all) of the one or more explicit deny policies determined at sub-operation 616A. The one or more explicit deny indications may include at least one name of the at least one explicit deny policy. The one or more explicit deny indications may also include at least one identification of at least one location that allows modification of the at least one explicit deny policy. As described above, explicit deny indications 121 of FIG. 1 may include a name of each indicated explicit deny policy and an identification (e.g., a URL, etc.) of a location (e.g., console page, infrastructure as code template interface, etc.) that allows modification of each indicated explicit deny policy. The explicit deny indications 121 may also have an associated description, which may indicate that the corresponding policies (or policy) explicitly deny access and that explicit denials must be removed in order to correct an unintended denial of access. At sub-operation 618B, at least one implicit deny indication is provided of at least one (and, in some cases, all) of the one or more denial-related policies that implicitly denies the attempted access. For example, sub-operation 618B may include providing at least one implicit deny indication of at least one (and, in some cases, all) of the one or more implicit deny policies determined at sub-operation 616B. The one or more implicit deny indications may include at least one name of the at least one implicit deny policy. The one or more implicit deny indications may also include at least one identification of at least one location that allows modification of the at least one implicit deny policy. As described above, implicit deny indications 122 of FIG. 1 may include a name of each indicated implicit deny policy and an identification (e.g., a URL, etc.) of a location (e.g., console page, infrastructure as code template interface, etc.) that allows modification of each indicated implicit deny policy. The implicit deny indications 121 may also have an associated description, which may indicate that the corresponding policies (or policy) implicitly deny access and that at least one relevant policy (e.g., either an identity policy and/or a resource policy) must allow access in order to correct an unintended denial of access.

At operation 620, one or more acceptable properties are determined of the plurality of relevant access permission policies that do not need to be modified to change the decision to deny the attempted access. Operation 620 may be performed based on the results of operation 614 described above. Specifically, as described above, the attempted access may be separately evaluated using each of the plurality of relevant policies to determine whether each of the plurality of relevant policies individually explicitly allows, explicitly denies and/or implicitly denies the attempted access. In some examples, an acceptable property may include a property that does not explicitly deny the attempted access. Thus, explicit allowance by a policy may be considered an acceptable property. Additionally, the absence of an explicit denial by a policy may also be considered an acceptable property. Thus, for example, if a property implicitly denies, but does not explicitly deny, the attempted access, the absence of the explicit denial may be considered an acceptable property of the policy.

At operation 622, one or more acceptability indications are provided of the one or more acceptable properties. As described above, the acceptability indications 124 of FIG. 1 may include, for example, indications of policies that explicitly allow access and/or policies that do not explicitly deny access. In one specific example, the acceptability indications 124 may include indications of each such policy (e.g., via policy name, URL, etc.) along with an indication that the policy explicitly allowed access and/or did not explicitly deny access.

At operation 624, a suggested modification indication is provided that indicates a policy modification that is performable, on at least one of the one or more denial-related policies, to cause the attempted access to be allowed. For example, the modification may be performable on an explicit deny policy and/or an implicit deny policy to cause the attempted access to be allowed. In some examples, the suggested modification may include an example statement that is addible into a policy to cause the attempted access to be allowed and/or an indication of a modification that would be easiest for a user to implement to cause the attempted access to be allowed. As described above, suggested modification indication 123 of FIG. 1 may include an example statement that may be added to a policy in order to allow the attempted access to be performed. Also, in some examples, in addition or as an alternative to an example statement, the suggested modification indication 123 may include an indication of a suggested policy that the user may edit in order to correct the denial of access. In one specific example, the policy evaluation tool 110 may evaluate all potential changes that may be made to different policies and may determine a change that would be easiest for the user to implement, such as a change that requires adding or modifying a fewest amount of characters in the contents of a policy. The policy evaluation tool may then suggest that the user modify the policy that is determined to be easiest to change, thereby reducing the amount of work required by the user to correct the access denial 100.

Thus, the examples described above with reference to FIGS. 1-6 relate to troubleshooting of an unintended denial of access. It is noted, however, that the techniques described herein may also be employed for troubleshooting of an unintended allowance of access. An unintended allowance of access may occur when a customer intends for a given identity not to be able to have a given access to a given resource, but the relevant policies are configured to allow the given identity to have the given access to the given resource. In some examples, unintended allowances may pose problems, such as security risks, for example, because they may violate the principal of least privilege, which specifies that identities should have only the access to resources that is necessary and should not have unnecessary access.

Figure 7:
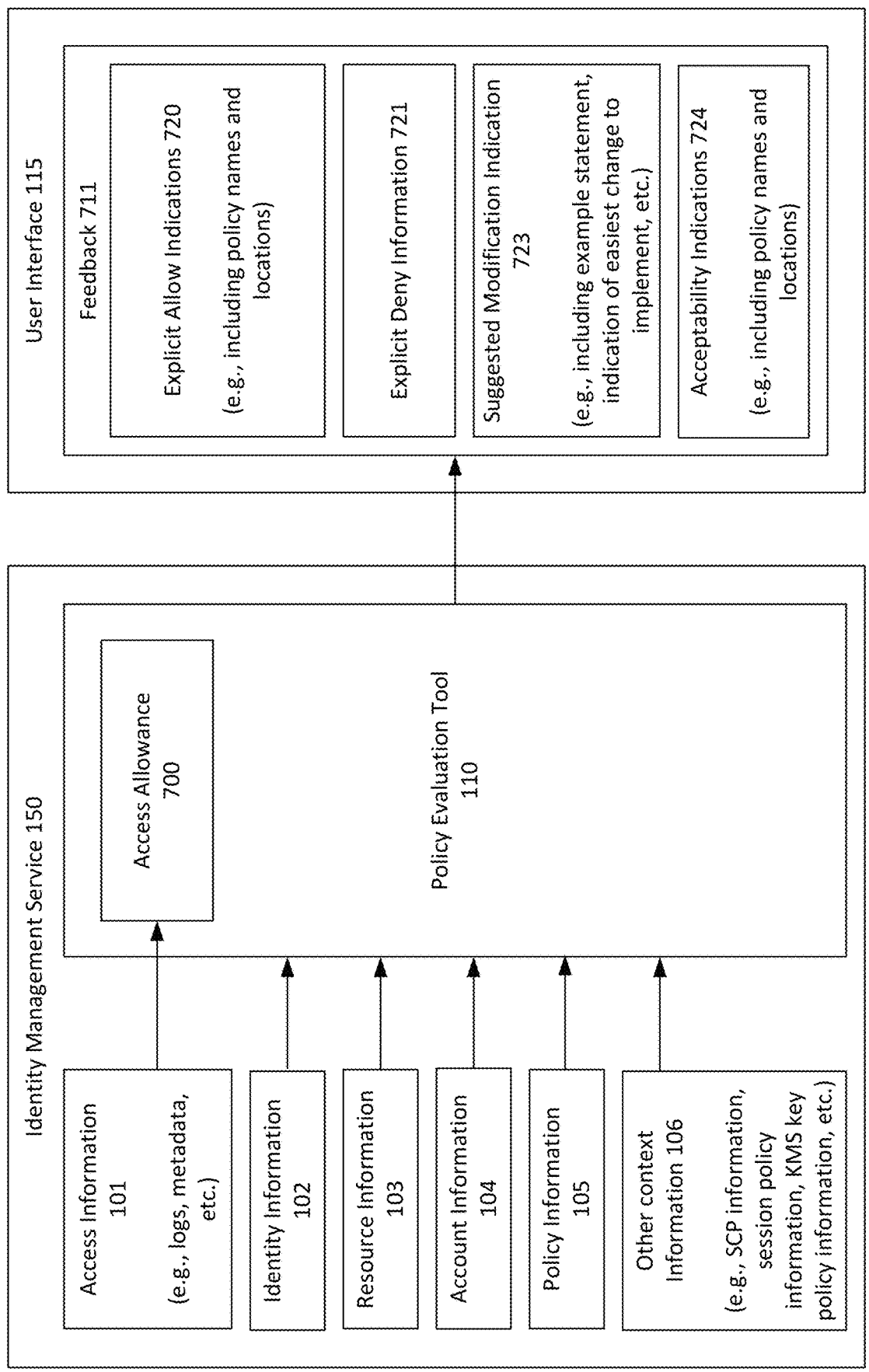
FIG. 7 is a diagram illustrating an example unintended access allowance troubleshooting system that may be used in accordance with the present disclosure.

FIG. 7 is a diagram illustrating an example unintended access allowance troubleshooting system that may be used in accordance with the present disclosure. In this example, policy evaluation tool 110, such as may be provided by identity management service 150, may be employed to provide feedback 711 regarding an access allowance 700, which may be an unintended allowance of access. Policy evaluation tool 110 may receive access information 101, which includes information pertaining to access allowance 700, such as information indicating the identity granted the access, the resource for which the access was granted, the type of access (e.g., type of API call) that was requested, session information for the access, and other relevant information. Some example categories of access may include read, write, permissions management, list, tagging, and others. An access type may include any types of access within these or other access categories. In some examples, access information 101 may be received from logs, such as logs that record customer activity (e.g., API calls). Also, in some examples, access information 101 may be received from metadata, such as such as metadata from a CLI or other interface and/or metadata from an identity, account, organization, resource, service, action or any other source.

Policy evaluation tool 110 may also access identity information 102, which includes information pertaining to the identity for which the access was granted, such as an indication of each policy that is attached to the identity. Policy evaluation tool 110 may also access resource information 103, which includes information pertaining to the resource upon which the access was granted, such as an indication of each policy that is attached to the resource. Policy evaluation tool 110 may also access account information 104, which includes information pertaining to the accounts associated with the identity management service 150, such as may be used to determine an account in which the identity is included, an account in which the resource is included, and an account of a user/operator of the policy evaluation tool 110. Policy evaluation tool 110 may also access policy information 105, which includes information pertaining to policies that are created and managed via the identity management service 150, for example including service-generated policies and customer-generated policies. For example, the policy information 105 may include indications of the permissions provided by policies that are created and managed via the identity management service 150.

Additionally, policy evaluation tool 110 may also access other context information 106, which includes additional context information, such as information indicating whether one or more additional policies (e.g., other than identity policies and resource policies) are relevant to access allowance 700. For example, these additional policies may include a service control policy (SCP), a session policy, a key management service (KMS) key policy, and other additional policies.

In some examples, based at least in part on access information 101, identity information 102, resource information 103, account information 104, policy information 105 and/or other context information 106, policy evaluation tool 110 may provide feedback 711 related to access allowance 700, such as to allow full or partial debugging of the access allowance 700. The feedback may be displayed in user interface 115. In the example of FIG. 7, feedback 711 includes explicit allow indications 720, which are indications of each relevant access permission policy that explicitly allows the requested access. In some examples, explicit allow indications 720 may include a name of each policy that explicitly allows access and an identification (e.g., a URL, etc.) of a location (e.g., console page, infrastructure as code template interface, etc.) of each such policy. The explicit allow indications 720 may also have an associated description, which may indicate that the corresponding policies (or policy) explicitly allow access. In some examples, the explicit allow indications 720 may explicitly state that a corresponding policy (or policies) explicitly allow access. However, it is not required that the explicit allow indications 720 must explicitly state that a corresponding policy (or policies) explicitly allow access. For example, in some cases, the explicit allow indications 720 may merely provide a description that indicates and/or allows a user to infer that a corresponding policy (or policies) explicitly allow access, such as a description that states that all explicit allows must be removed when there is no applicable explicit denial.

The feedback 711 may also include explicit deny information 721. The explicit deny information 721 may indicate to a user that, in addition or as an alternative to removing an explicit allowance of the access, an explicit denial of the access may also be added in order to cause the allowed access to be denied. The explicit deny information 721 may also indicate that an explicit denial may trump any applicable explicit allowances. In some examples, the explicit denial may be added by creating a new explicit denial to deny the unintentionally allowed access or by expanding the scope of an existing explicit denial to include the unintentionally allowed access. In one specific example, the policy evaluation tool 110 may determine one or more relevant policies with existing explicit denials and provide, within explicit deny information 721, indications of these policies (e.g., including names and URL's) and a description indicating that the existing explicit denials could be expanded to include the unintentionally allowed access.

In this example, feedback 711 also includes suggested modification indication 723, which is an indication of a particular suggested modification that may be made to a policy in order to cause the allowed access to be denied. In some examples, suggested modification indication 723 may include an example statement that may be added to a policy in order to allow the allowed access to be denied. Also, in some examples, in addition or as an alternative to an example statement, the suggested modification indication 723 may include an indication of a suggested policy that the user may edit in order to cause the allowed access to be denied. In one specific example, the policy evaluation tool 110 may evaluate all potential changes that may be made to different policies and may determine a change that would be easiest for the user to implement, such as a change that requires adding or modifying a fewest amount of characters in the contents of a policy. The policy evaluation tool may then suggest that the user modify the policy that is determined to be easiest to change, thereby reducing the amount of work required by the user to correct the access allowance 700.

In some examples, the policy evaluation tool 110 may perform an analysis of permissions used by a customer (e.g., by accessing account information 104, policy information 105, etc.) to determine how frequently the customer uses explicit denies. If the customer frequently uses existing denies, then the policy evaluation tool 110 may suggest to the customer to correct an unintended allowance by using an explicit deny (e.g., by adding a new explicit deny and/or expanding the scope of an existing explicit deny) as opposed to removing an explicit allow. This is because the customer may be familiar with, and may prefer to use, explicit denies. By contrast, if the customer doesn't frequently use existing denies, then the policy evaluation tool 110 may suggest to the customer to correct an unintended allowance by removing an explicit allow (e.g., by completely deleting the explicit allow and/or by reducing the scope of the explicit allow) as opposed to using an explicit deny. This is because the use of explicit denies may be confusing to a customer that does not commonly work with them. Thus, in some examples, a type of suggested change (e.g., the use of an explicit allow or an explicit deny) that is included in the suggested modification indication 723 (or that is otherwise promoted or suggested to a customer) may sometimes be determined based at least in part on a frequency with which a customer uses explicit denies and/or explicit allows.

In this example, feedback 711 also includes acceptability indications 724, which are indications of acceptable properties. In the context of an unintended allowance of access, the acceptable properties may be policy properties that don't need to be changed in order to cause the allowed access to be denied. The acceptability indications 724 may include, for example, indications of policies that do not explicitly allow access. In one specific example, the acceptability indications 124 may include indications of each such policy (e.g., via policy name, URL, etc.) along with an indication that the policy does not explicitly allow access. The acceptability indications 724 may help the customer to rule-out features that do not need to be changed in order to correct an unintended allowance of access. This may be particularly advantageous in scenarios in which a policy that explicitly causes an allowance of access may not be accessible to a given user, such as scenarios in which the policy is managed by an account that a user cannot access. In these scenarios, the policy evaluation tool 110 may help a given user to partially debug an unintended allowance of access, such as by allowing a user to confirm that he or she has made any necessary changes in the accounts that he or she is permitted to access.

Figure 8:
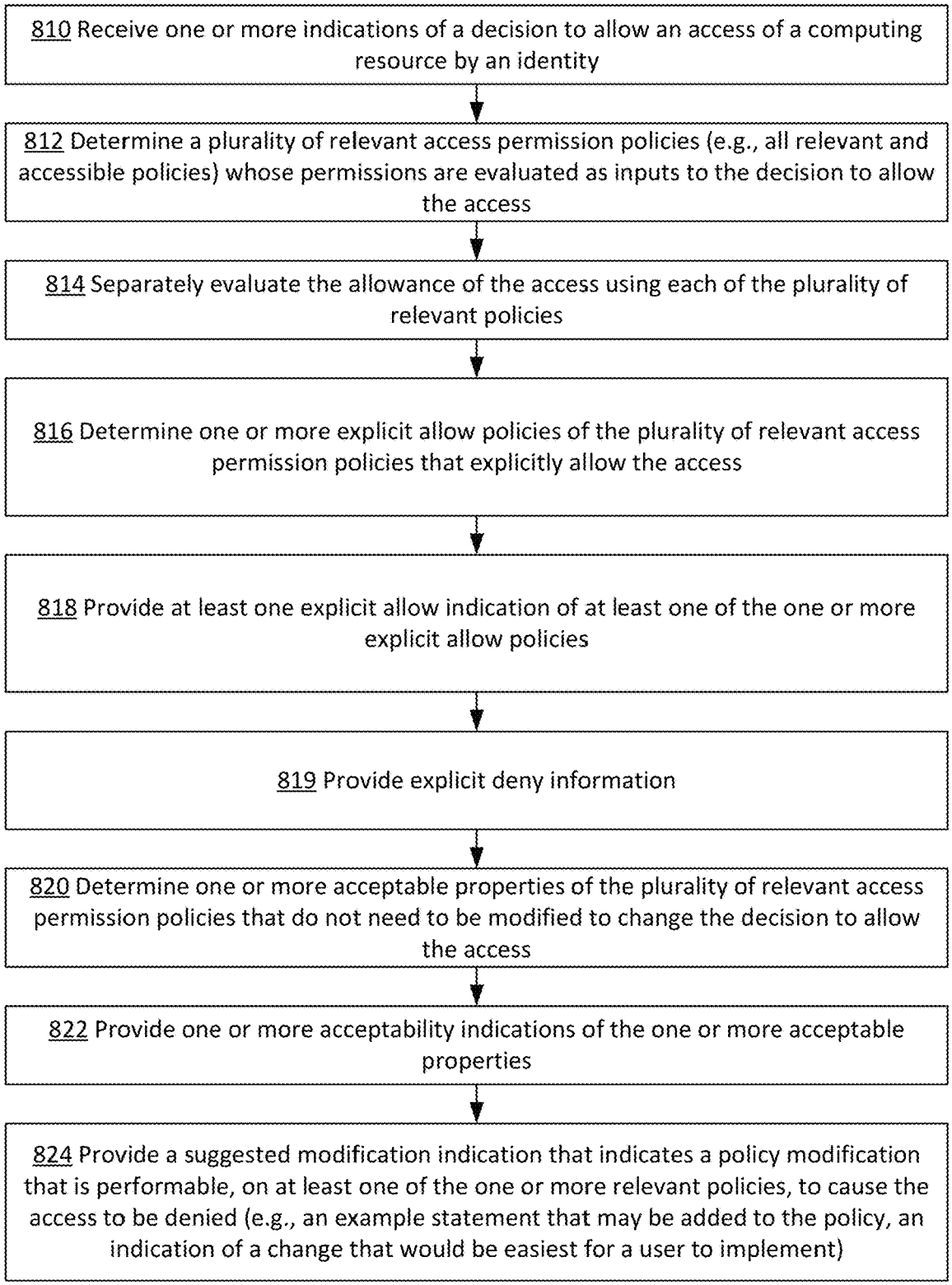
FIG. 8 is a flowchart illustrating an example unintended access allowance troubleshooting process that may be used in accordance with the present disclosure.

FIG. 8 is a flowchart illustrating an example unintended access allowance troubleshooting process that may be used in accordance with the present disclosure. In some examples, any, or all, of operations 810-824 of FIG. 8 may be performed by an identity management service 150, such as by policy evaluation tool 110 of identity management service 150. The process of FIG. 8 is initiated at operation 810, at which one or more indications are received of a decision to allow an access of a computing resource by an identity. The allowed access may be unintended, meaning that a customer intends for the identity not to be able to have the access to the resource, but the relevant policies are configured to allow the identity to have the access to the resource. As described above with reference to FIG. 7, policy evaluation tool 110 may receive access information 101, which includes information pertaining to access allowance 700, such as information indicating the identity granted the access, the resource for which the access was allowed, the type of access (e.g., type of API call) that was granted, session information for the access, and other relevant information. Some example categories of access may include read, write, permissions management, list, tagging, and others. An access type may include any types of access within these or other access categories. In some examples, access information 101 may be received from logs, such as logs that record customer activity (e.g., API calls). Also, in some examples, access information 101 may be received from metadata, such as such as metadata from a CLI or other interface and/or metadata from an identity, account, organization, resource, service, action or any other source.

At operation 812, a plurality of relevant access permission policies is determined whose permissions are evaluated as inputs to the decision to allow the access. In the context of a decision to allow access, the relevant policies are each policy whose permissions are evaluated as inputs to the decision to allow access to the resource. In some examples, the relevant policies may include all policies that are attached to the identity that is granted the access and all policies that are attached to the resource upon which the access is granted. It is noted, however, that the relevant policies may sometimes include additional policies (if applicable), such as an SCP, a session policy, a KMS key policy, and others. In some examples, the policy evaluation tool 110 may determine only those policies that are both relevant and accessible to the tool's operator. For example, accessible policies may include policies that are modifiable by (e.g., within the same account as) a current operator of the policy evaluation tool 110.

As described above, in some examples, in order to determine the relevant policies, the policy evaluation tool 110 may access identity information 102, resource information 103, account information 104, and other context information 106. Identity information 102 includes information pertaining to the identity that was granted the access, such as an indication of each policy that is attached to the identity. Resource information 103 includes information pertaining to the resource upon which the access was granted, such as an indication of each policy that is attached to the resource. Account information 104 includes information pertaining to the accounts associated with the identity management service 150, such as may be used to determine an account in which the identity is included, an account in which the resource is included, and an account of a user/operator of the policy evaluation tool 110. Other context information 106 includes additional context information, such as information indicating whether one or more additional policies (e.g., other than identity policies and resource policies) are relevant to access allowance 700. For example, these additional policies may include a service control policy (SCP), a session policy, a key management service (KMS) key policy, and other additional policies.

At operation 814, the allowance of access is separately evaluated using each of the plurality of relevant policies. For example, the allowed access may be separately evaluated using each of the plurality of relevant policies to determine whether each of the plurality of relevant policies individually explicitly allows the attempted access. A policy may explicitly allow the attempted access if its permissions explicitly allow the access. Moreover, in some examples, operation 814 may also include separately evaluating each of the plurality of relevant policies to determine whether an existing explicit deny is included in that policy. The existing explicit deny may be an explicit denial that is included in a relevant policy but that does not explicitly deny the unintentionally allowed access that is being troubleshooted. As described above, policy information 105 includes information pertaining to policies that are created and managed via the identity management service 150, for example including service-generated policies and customer-generated policies. For example, the policy information 105 may include indications of the permissions provided by policies that are created and managed via the identity management service 150.

At operation 816, one or more explicit allow policies of the plurality of relevant access permission policies are determined that explicitly allow the access. Operation 816 may be performed based on the results of operation 814 described above. Specifically, as described above, the allowed access may be separately evaluated using each of the plurality of relevant policies to determine whether each of the plurality of relevant policies individually explicitly allows the allowed access. A policy may explicitly allow the attempted access if its permissions explicitly allow the attempted access.

At operation 818, at least one explicit allow indication is provided of at least one (and, in some cases, all) of the one or more explicit allow policies. In some examples, explicit allow indications of all of the explicit allow policies may be provided. Operation 818 may include displaying, in a user interface, indications of the explicit allow policies, such as a name of each of the one or more explicit allow policies. Additionally, the at least one explicit allow indication may include at least one identification (e.g., URL, etc.) of at least one location (e.g., console page, infrastructure as code template interface, etc.) that allows modification of the at least one of the one or more explicit allow policies. As described above, explicit allow indications 720 of FIG. 7 may include a name of each indicated explicit allow policy and an identification (e.g., a URL, etc.) of a location (e.g., console page, infrastructure as code template interface, etc.) that allows modification of each indicated explicit allow policy. The explicit allow indications 720 may also have an associated description, which may indicate that the corresponding policies (or policy) explicitly allow access and that indicates that all explicit allows must be removed when there is no applicable explicit denial.

At operation 819, explicit deny information is provided. The explicit deny information may indicate to a user that, in addition or as an alternative to removing an explicit allowance of the access, an explicit denial of the access may also be added in order to cause the allowed access to be denied. The explicit deny information may also indicate that an explicit denial may trump any applicable explicit allowances. In some examples, the explicit denial may be added by creating a new explicit denial to deny the unintentionally allowed access or by expanding the scope of an existing explicit denial to include the unintentionally allowed access. Thus, in some examples, operation 819 may include providing an indication to add an explicit denial of the access to one or more of the plurality of relevant access permission policies. The indication to add the explicit denial of the access may comprise an indication to create a new explicit denial and/or an indication to expand a scope of an existing explicit denial. In one specific example, the policy evaluation tool 110 may determine one or more relevant policies with existing explicit denials and provide, within the explicit deny information, indications of these policies (e.g., including names and URL's) and a description indicating that the existing explicit denials could be expanded to include the unintentionally allowed access.

At operation 820, one or more acceptable properties are determined of the plurality of relevant access permission policies that do not need to be modified to change the decision to allow the access. Operation 820 may be performed based on the results of operation 814 described above. Specifically, as described above, the allowed access may be separately evaluated using each of the plurality of relevant policies to determine whether each of the plurality of relevant policies individually explicitly allows the access. In some examples, an acceptable property may include a property that does not explicitly allow the attempted access. Thus, the absence of an explicit allow by a policy may be considered an acceptable property.

At operation 822, one or more acceptability indications are provided of the one or more acceptable properties. As described above, the acceptability indications 724 of FIG. 7 may include, for example, indications of policies that do not explicitly allow the access. In one specific example, the acceptability indications 724 may include indications of each such policy (e.g., via policy name, URL, etc.) along with an indication that the policy did not explicitly allow access.

At operation 824, a suggested modification indication is provided that indicates a particular suggested policy modification that is performable, on at least one of the one or more relevant policies, to cause the allowed access to be denied. In some examples, the suggested modification may include an example statement that is addible into a policy to cause the allowed access to be denied and/or an indication of a modification that would be easiest for a user to implement to cause the allowed access to be denied. As described above, suggested modification indication 723 of FIG. 7 may include an example statement that may be added to a policy in order to cause the allowed access to be denied. Also, in some examples, in addition or as an alternative to an example statement, the suggested modification indication 723 may include an indication of a suggested policy that the user may edit in order to cause the allowed access to be denied. In one specific example, the policy evaluation tool 110 may evaluate all potential changes that may be made to different policies and may determine a change that would be easiest for the user to implement, such as a change that requires adding or modifying a fewest amount of characters in the contents of a policy. The policy evaluation tool may then suggest that the user modify the policy that is determined to be easiest to change, thereby reducing the amount of work required by the user to correct the access allowance 700. As also described above, in some examples, the policy evaluation tool 110 may perform an analysis of permissions used by a customer (e.g., by accessing account information 104, policy information 105, etc.) to determine how frequently the customer uses explicit denies. If the customer frequently uses existing denies, then the policy evaluation tool 110 may suggest to the customer to correct an unintended allowance by using an explicit deny (e.g., by adding a new explicit deny and/or expanding the scope of an existing explicit deny) as opposed to removing an explicit allow. This is because the customer may be familiar with, and may prefer to use, explicit denies. By contrast, if the customer doesn't frequently use existing denies, then the policy evaluation tool 110 may suggest to the customer to correct an unintended allowance by removing an explicit allow (e.g., by completely deleting the explicit allow and/or by reducing the scope of the explicit allow) as opposed to using an explicit deny. This is because the use of explicit denies may be confusing to a customer that does not commonly work with them. Thus, in some examples, a type of suggested change (e.g., the use of an explicit allow or an explicit deny) that is included in the suggested modification indication 723 (or that is otherwise promoted or suggested to a customer) may sometimes be determined based at least in part on a frequency with which a customer uses explicit denies and/or explicit allows.

Figure 9:
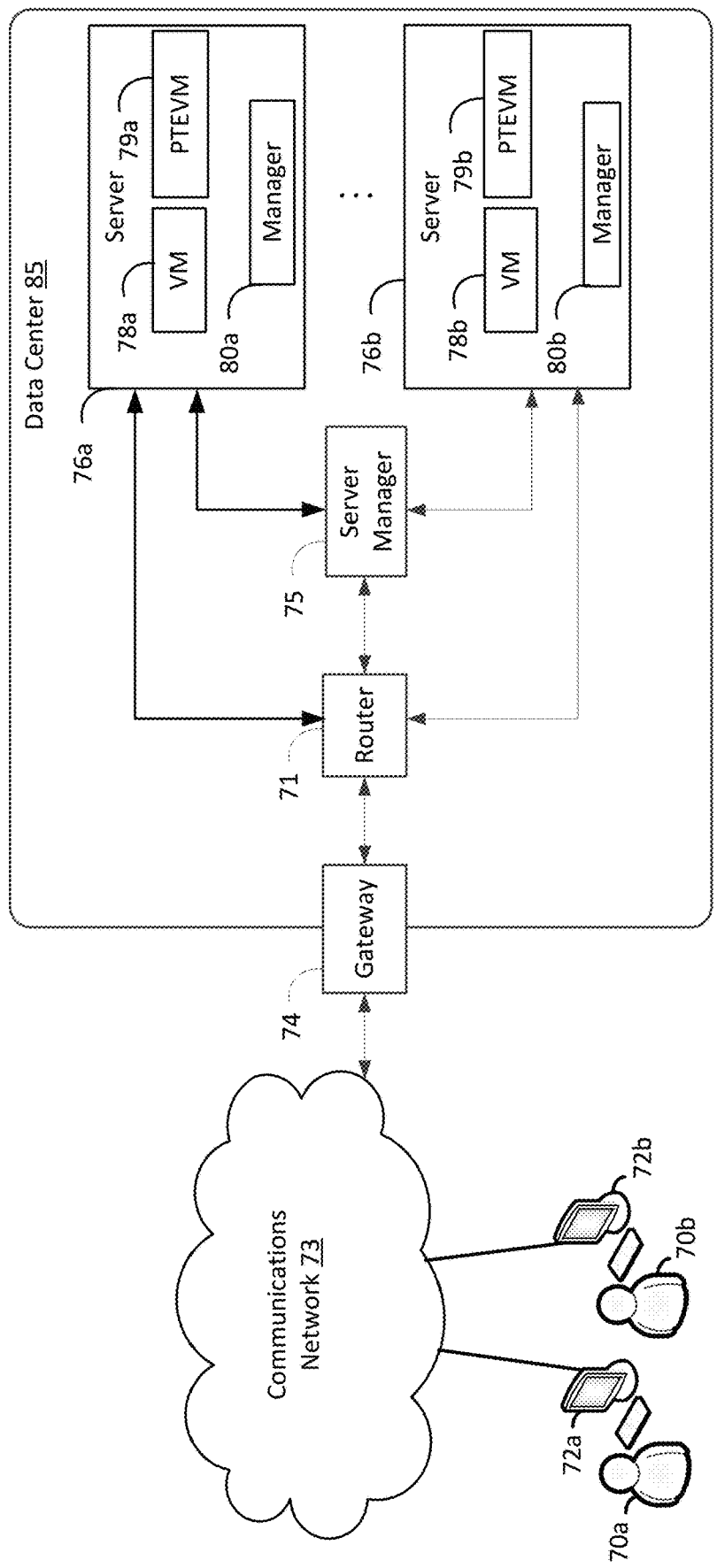
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include policy troubleshooting evaluation virtual machines (PTEVM's) 79*a-b*, which are virtual machines that are configured to execute any, or all, of the policy troubleshooting evaluation techniques described above, such as including, but not limited to, techniques for troubleshooting unintended denials of access and/or unintended allowances of access.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76*a* and 76*b*. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
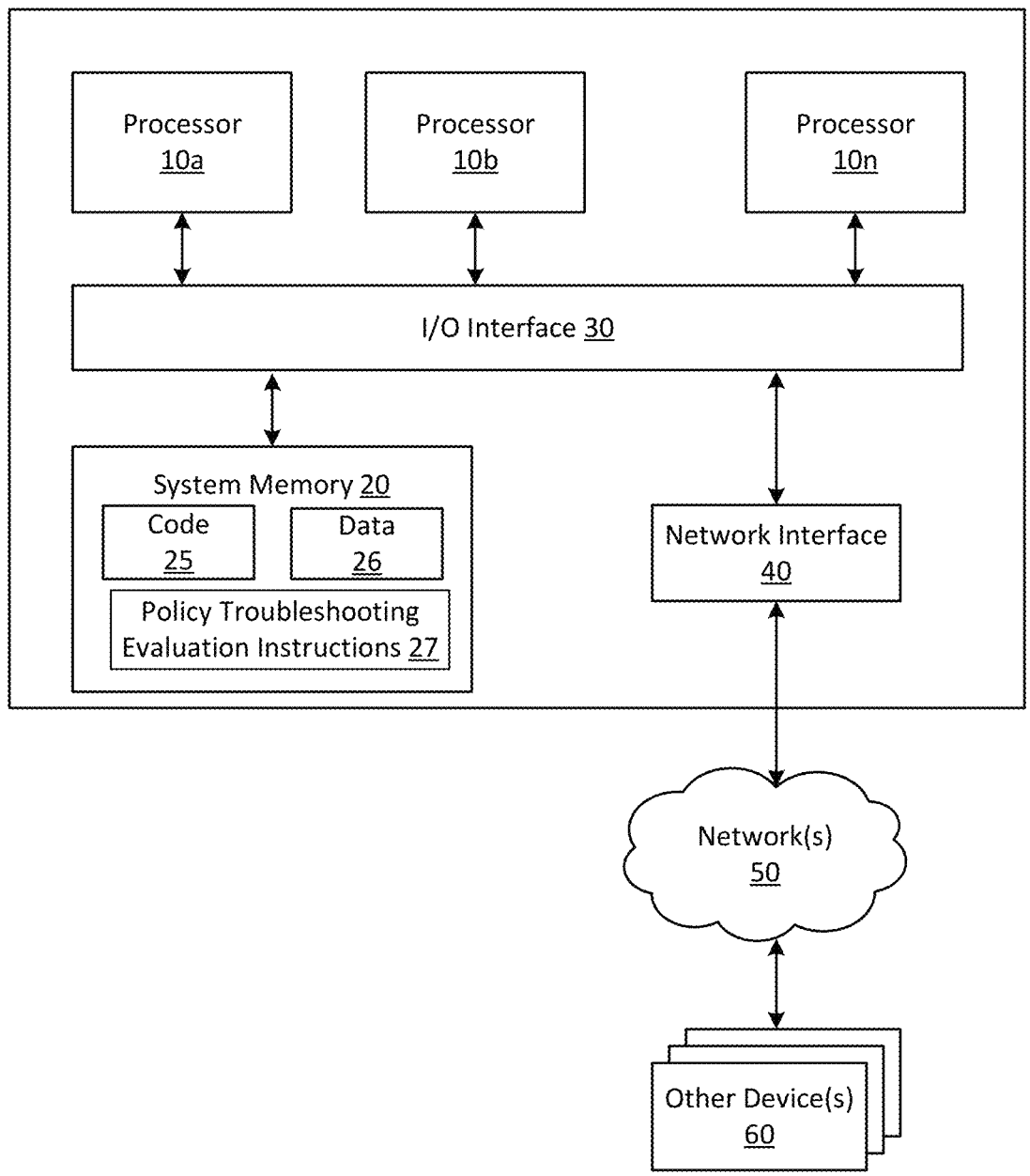
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes policy troubleshooting evaluation instructions 27, which are instructions for executing any, or all, of the policy troubleshooting evaluation techniques described above, such as including, but not limited to, techniques for troubleshooting unintended denials of access and/or unintended allowances of access.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform computing operations comprising:
      receiving one or more indications of a decision to allow an access of a computing resource by an identity;
      determining a plurality of relevant access permission policies whose permissions are evaluated as inputs to the decision to allow the access;
      determining one or more explicit allow policies of the plurality of relevant access permission policies that explicitly allow the access;
      providing at least one explicit allow indication of at least one of the one or more explicit allow policies; and
      providing a suggested modification indication that indicates a policy modification that is performable to cause the access to be denied.

2. The computing system of claim 1, wherein the operations further comprise:
   providing an indication to add an explicit denial of the access to one or more of the plurality of relevant access permission policies.

3. The computing system of claim 2, wherein the indication to add the explicit denial of the access comprises at least one of an indication to create a new explicit denial or an indication to expand a scope of an existing explicit denial.

4. The computing system of claim 1, wherein the at least one explicit allow indication comprises at least one identification of at least one location that allows modification of the at least one of the one or more explicit allow policies.

5. A computer-implemented method comprising:
   receiving one or more indications of a decision to allow an access of a computing resource by an identity;
   determining a plurality of relevant access permission policies whose permissions are evaluated as inputs to the decision to allow the access;
   determining one or more explicit allow policies of the plurality of relevant access permission policies that explicitly allow the access;
   providing at least one explicit allow indication of at least one of the one or more explicit allow policies; and
   providing a suggested modification indication that indicates a policy modification that is performable to cause the access to be denied.

6. The computer-implemented method of claim 5, further comprising:
   determining one or more acceptable properties of the plurality of relevant access permission policies that do not need to be modified to change the decision to allow the access; and
   providing one or more acceptability indications of the one or more acceptable properties.

7. The computer-implemented method of claim 5, wherein the at least one explicit allow indication comprises at least one identification of at least one location that allows modification of the at least one of the one or more explicit allow policies.

8. The computer-implemented method of claim 5, wherein the suggested modification indication comprises at least one of an example statement that is addible to a policy to cause the access to be denied or an indication of a modification that would be easiest for a user to implement to cause the access to be denied.

9. The computer-implemented method of claim 5, wherein a type of suggested change that is included in the suggested modification indication is determined based at least in part on a frequency with which a customer uses explicit denies.

10. The computer-implemented method of claim 5, wherein the plurality of relevant access permission policies comprise all policies attached to the identity and all policies attached to the computing resource.

11. The computer-implemented method of claim 5, further comprising:
   providing an indication to add an explicit denial of the access to one or more of the plurality of relevant access permission policies.

12. The computer-implemented method of claim 11, wherein the indication to add the explicit denial of the access comprises at least one of an indication to create a new explicit denial or an indication to expand a scope of an existing explicit denial.

13. One or more non-transitory computer-readable storage media having stored thereon computing instructions that, upon execution by one or more computing devices, cause the one or more computing devices to perform computing operations comprising:
   receiving one or more indications of a decision to allow an access of a computing resource by an identity;
   determining a plurality of relevant access permission policies whose permissions are evaluated as inputs to the decision to allow the access;
   determining one or more explicit allow policies of the plurality of relevant access permission policies that explicitly allow the access;
   providing at least one explicit allow indication of at least one of the one or more explicit allow policies; and
   providing a suggested modification indication that indicates a policy modification that is performable to cause the access to be denied.

14. The one or more non-transitory computer-readable storage media of claim 13, wherein the operations further comprise:
   determining one or more acceptable properties of the plurality of relevant access permission policies that do not need to be modified to change the decision to allow the access; and
   providing one or more acceptability indications of the one or more acceptable properties.

15. The one or more non-transitory computer-readable storage media of claim 13, wherein the at least one explicit allow indication comprises at least one identification of at least one location that allows modification of the at least one of the one or more explicit allow policies.

16. The one or more non-transitory computer-readable storage media of claim 13, wherein a type of suggested change that is included in the suggested modification indication is determined based at least in part on a frequency with which a customer uses explicit denies.

17. The one or more non-transitory computer-readable storage media of claim 13, wherein the operations further comprise:
   providing an indication to add an explicit denial of the access to one or more of the plurality of relevant access permission policies.

18. The one or more non-transitory computer-readable storage media of claim 17, wherein the indication to add the explicit denial of the access comprises at least one of an indication to create a new explicit denial or an indication to expand a scope of an existing explicit denial.

19. The computing system of claim 1, wherein the operations further comprise:
   determining one or more acceptable properties of the plurality of relevant access permission policies that do not need to be modified to change the decision to allow the access; and
   providing one or more acceptability indications of the one or more acceptable properties.

20. The computing system of claim 1, wherein the suggested modification indication comprises at least one of an example statement that is addible to a policy to cause the access to be denied or an indication of a modification that would be easiest for a user to implement to cause the access to be denied.

* * * * *